United States Patent [19]
Schimmel et al.

[11] Patent Number: 4,885,690
[45] Date of Patent: Dec. 5, 1989

[54] SYSTEM FOR OPTIMIZING DRIVING PARAMETERS IN UTILITY VEHICLES

[75] Inventors: Johannes Schimmel; Harald Bauer; Gunther Burian; Heinz Hulla, all of Steyr; Robert Kagerer, Neuzeug; Helmut Kubin, Steyr, all of Austria

[73] Assignee: Steyr-Daimler-Puch AG, Vienna, Austria

[21] Appl. No.: 100,163

[22] Filed: Sep. 23, 1987

Related U.S. Application Data

[63] Continuation-in-part of Ser. No. 696,041, Jan. 29, 1985, abandoned.

[30] Foreign Application Priority Data

Feb. 1, 1984 [AT] Austria ................... 319/84

[51] Int. Cl.⁴ .............. G05D 13/58; F16H 5/52; F02D 43/04
[52] U.S. Cl. .................. 364/424.1; 74/866; 364/431.07
[58] Field of Search ............ 364/424, 424.1, 442; 434/71; 340/52 R, 52 D; 74/866; 73/118

[56] References Cited

U.S. PATENT DOCUMENTS

| 4,267,545 | 5/1981 | Drone et al. | 340/52 D |
| 4,408,293 | 10/1983 | Avins | 364/424.1 |
| 4,439,158 | 3/1984 | Weber | 434/71 |
| 4,459,671 | 7/1984 | Teass et al. | 364/442 |
| 4,485,443 | 11/1984 | Knödler et al. | 364/424.1 |
| 4,523,281 | 6/1985 | Noda et al. | 364/424.1 |
| 4,541,052 | 9/1985 | McCulloch | 364/424.1 |
| 4,542,460 | 9/1985 | Weber | 364/424.1 |
| 4,564,906 | 1/1986 | Stephan et al. | 364/424.1 |
| 4,570,226 | 2/1986 | Aussedat | 364/442 |
| 4,598,374 | 7/1986 | Klatt | 364/424.1 |
| 4,701,852 | 10/1987 | Ulveland | 364/424.1 |
| 4,737,915 | 4/1988 | Hosaka | 364/424.1 |

FOREIGN PATENT DOCUMENTS

| 0104784 | 4/1984 | European Pat. Off. | 364/442 |
| 0106789 | 4/1984 | European Pat. Off. | |
| 3128080 | 2/1983 | Fed. Rep. of Germany | 364/424.1 |
| 8200114 | 10/1982 | PCT Int'l Appl. | |
| 1330350 | 9/1973 | United Kingdom | |
| 2084524 | 4/1982 | United Kingdom | 364/442 |

Primary Examiner—Felix D. Gruber
Attorney, Agent, or Firm—Marmorek, Guttman & Rubenstein

[57] ABSTRACT

A device and method for optimizing operation of a utility vehicle is disclosed. The optimizing device comprises engine and transmission data sensors which input current operating parameters to a microcomputer having a memory containing optimizing programs, thereby enabling the microcomputer to generate optimized commands which are displayed on indicating means so that an operator can adjust the operating controls.

4 Claims, 3 Drawing Sheets

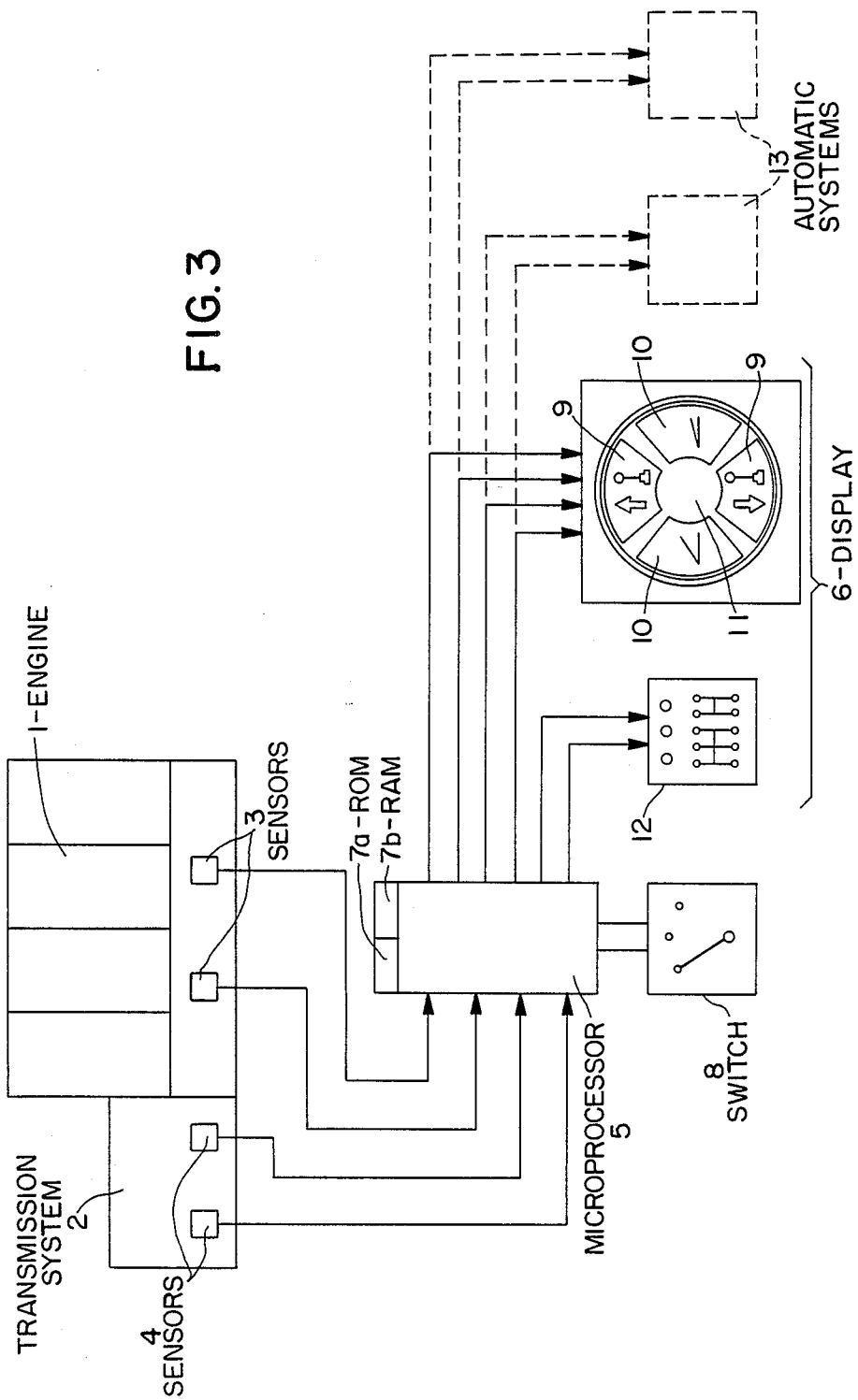

SYSTEM FOR OPTIMIZING DRIVING PARAMETERS IN UTILITY VEHICLES

CROSS REFERENCE

This is a continuation-in-part application of Ser. No. 696,041, filed Jan. 29, 1985 and now abandoned.

FIELD OF THE INVENTION

The invention relates to a system for optimizing driving parameters in utility vehicles, such as farming tractors attached to a farming trailer. In particular, the system allows an operator to optimize the operating parameters of the utility vehicle selectively for fuel economy or for minimizing the operating time of the utility vehicle to accomplish its tasks.

BACKGROUND OF THE INVENTION

Utility vehicles are widely used in many industries. Typically, a utility vehicle such as a farming tractor is used along with a trailer which carries out a farming function. As used herein, a "utility vehicle" is a tractor or the like and optionally used with a trailer or the like. Many different types of trailers can be used with a farming tractor as is well known in the art. The operation of a farming tractor and trailer combination usually has at least one person to operate the tractor. For many operations or tasks, additional people are needed.

It is desirable to operate a utility vehicle in order to minimize operating costs. This is particularly important in farming because of the high costs associated with the use of utility vehicles. While there are many approaches available for optimizing costs, there are two important approaches for optimizing driving parameters relative to the instant invention. Generally, the terms "optimum", "optimization" and "optimizing" refer to obtaining operating conditions for maintaining a predetermined minimum or maximum of a parameter such as fuel consumption, work output per unit time or the like. Other parameters or measurable quantities can be used to evaluate a selected parameter. The operating conditions are usually defined by ranges to avoid excessive demands for maintaining an optimum operating status.

One important approach for optimizing driving parameters is to focus on fuel costs. Under such circumstances, the selection of the operating gear and the engine speed for the farming tractor are coordinated so that fuel consumption is minimized for the engine speed or gear selected by the operator. In such operation, if the operator or driver selects a particular operating transmission gear or gear ratio, the speed of the engine is selected by the use of the throttle or fuel pedal in order to minimize fuel consumption for the selected operating transmission gear. If, however, the operator operates the throttle so as to obtain a particular engine speed, then the operator changes the gear ratio in order to provide fuel economy for the selected engine speed. Generally, ranges are used for parameters. Thus, the engine speed need only be within a certain range to fulfill the goal of optimum economy.

British Patent No. 1,330,350 discloses a system for fuel efficiency for a vehicle. U.S. Pat. No. 4,439,158 discloses a system for providing an indicator to inform an operator of an appropriate gear ratio for a given engine speed in order to economize fuel. U.S. Pat. No. 4,459,671 also discloses a system for fuel management control for a vehicle. These patents are incorporated herein by reference. Numerous other prior art references address this problem and show the degree of sophistication of skilled individuals in the art.

Fuel economy calculations for a vehicle such as a utility vehicle preferably utilizes actual performance data for the vehicle. Such data is accumulated by measurements being carried out for the vehicle under different operating conditions. The data can be stored in a conventional computer memory and a conventional computer is used to establish the correlation between gear ratio and engine speed to establish fuel economy.

Another important operating condition is to maximize the production or work output of the utility vehicle per unit time. As used herein, the "maximum work output per unit time" refers to maximizing the work or task of the utility vehicle per unit time. The work or task can be collecting a product, or treating the soil or the like. This is particularly important when the work or task is "labor intensive". That is, the work requires support personnel. In some cases, the task of the utility vehicle may be to cut and collect wheat while in another operation the utility vehicle may be to aerate the soil. For some operations or tasks, the combination of the farming tractor and farming trailer requires the help of additional workers and the total cost per unit time for the task can be substantially large due to the labor costs.

Generally, a high operating cost per unit time for a task creates an incentive to minimize the operating time by maximizing the output per unit time. It is convenient to measure the output per unit time in terms of the engine torque which is referred to herein as the "engine power output". The loading of the engine or the transmission system producing the engine power output can be measured by measuring the rotational speed at the output of the transmission system. As in the case of fuel economy, data must be collected in order to establish the relationship between the transmission loading or speed and engine speed relative to output per unit time. Some of the data can be based on theoretical calculations and other data ca be obtained empirically. The computations for optimization can be carried out using a conventional computer. U.S. Pat. No. 4,485,443 discloses a system for controlling the torque in a fluid-operated friction coupling clutch. U.S. Pat. No. 4,541,052 discloses a vehicle power output regulation control system. These patents are incorporated herein by reference.

The references disclosed herein are indicative of the interest in the prior art of optimizing the operation of vehicles. While these references provide partial solutions, none of these references provides a broad solution for optimizing a utility vehicle under different important operating conditions. Furthermore, the prior art does not address the optimization of output per unit time. Generally, the references disclosed herein have substantial different operating components so that combinations of systems are not realizable. Furthermore, even if the references were combined, the instant invention would not be produced.

SUMMARY OF THE INVENTION

It is the purpose of the invention to eliminate the deficiencies in the prior art and to provide a system for optimizing the parameters of a utility vehicle under the two aforementioned important conditions. Broadly, the invention in one embodiment is substantially automatic while in another embodiment information is supplied to an operator so that a manual input can be used to achieve its goals.

The invention is a device and a method for optimizing the performance of a utility vehicle. The utility vehicle includes an engine and a transmission system. The engine has an engine speed which can be varied using a throttle or fuel pedal or the like and the transmission system includes gears which can be selectively interacted to produce a gear ratio. The transmission system has a rotational speed at the transmission output and the transmission output and speed are related to the engine power output.

The invention uses data and information compiled and stored in a memory accessible by a computer for evaluation the real time operation of the utility vehicle and providing information to the operator.

Data for the computer computations are collected using conventional techniques in order to relate engine speed, transmission speed, transmission output, fuel economy, engine power output, operating costs per unit time of support personnel and other relevant parameters. This data is stored in a conventional memory which can be accessed by a conventional computer. Using conventional techniques, a computer such as a microprocessor can be used to relate engine speed and gear ratio to optimize either fuel consumption or to work output per unit time. This choice either minimizes fuel costs or maximizes work output per unit time.

Initially, a choice is made by the operator to optimize either vehicle fuel use or work output per unit time. This choice is made by selecting a preset range of engine speed and engine power output.

Sensors are used for sensing the engine speed and the engine power output of the utility vehicle. The sensed values of engine speed and engine power output are compared to the selected ranges of engine speed and engine power output. The results of this comparison can either produce a signal informing the operator of the utility vehicle to make an appropriate change, if necessary or can produce any appropriate change through an automatic operation.

BRIEF DESCRIPTION OF THE DRAWINGS

FIG. 3 is a block diagram of a device according to the invention.

DESCRIPTION OF THE INVENTION

Figure 1:
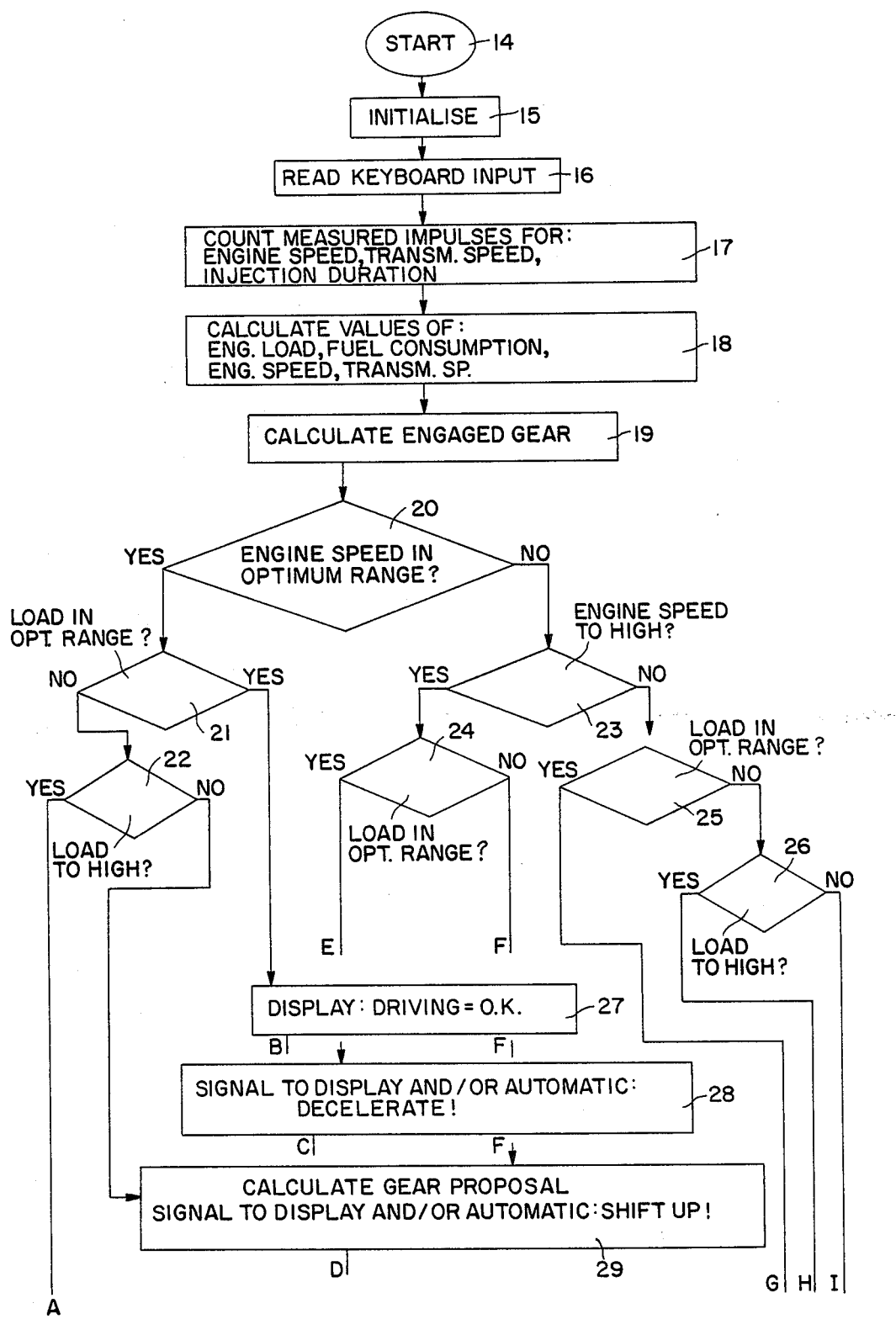
FIGS. 1 and 2 are a flow diagram showing one embodiment of decision and operating steps carried out in accordance with the invention.
Figure 2:
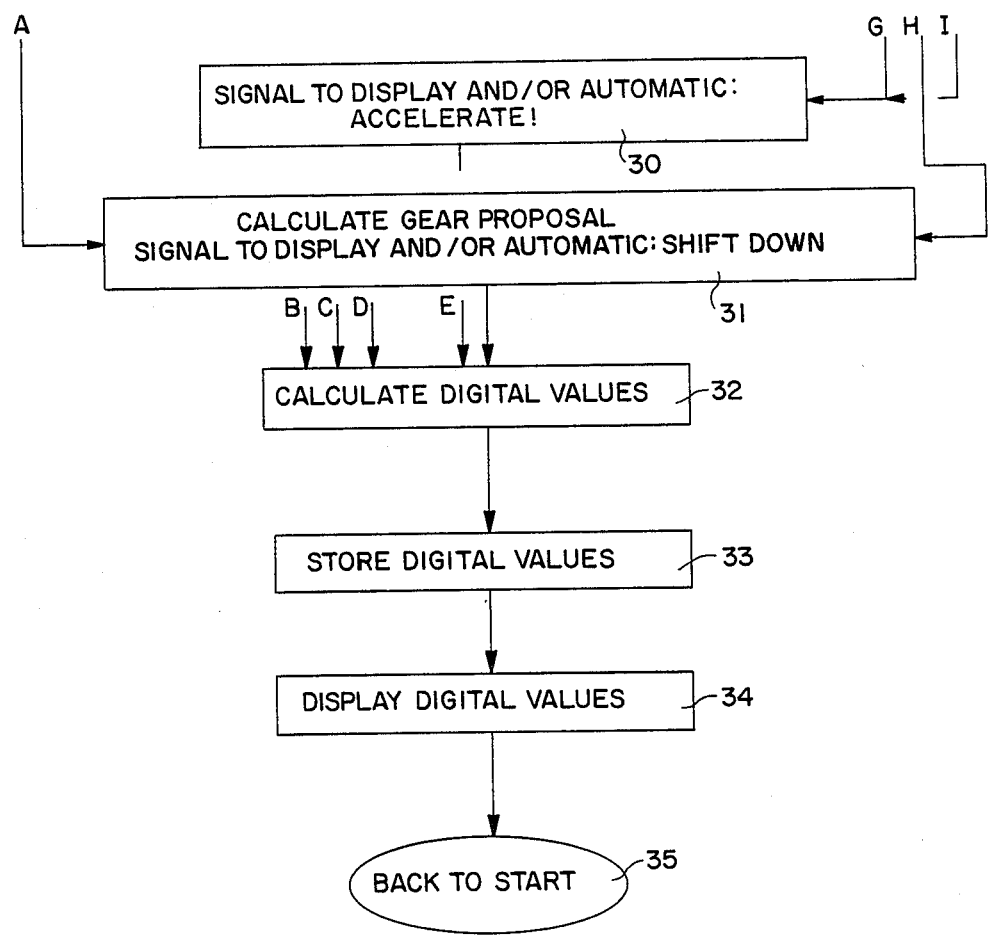

Turning to the figures, FIGS. 1 and 2 show a flow diagram of the decisions and operations made for carrying out an embodiment of the invention as shown in FIG. 3. The continuation of lines from FIG. 1 to FIG. 2 ar identified by alphabetical letters. Block 14 indicates the commencement of the decision process. Block 15 represents the initialization operation of providing data for carrying out the flow diagram. This data can be theoretical and/or empirical. Preferably, the data is collected from experimentation and information currently available such as fuel costs, cost of personnel per unit time, etc.

Block 16 of the flow diagram indicates that the operator inputs data such as through a keyboard which is read and which represents the selection made for optimizing the operation of the utility vehicle. Block 17 indicates that a microcomputer collects data relating to the real time performance of the utility vehicle. This data can include engine speed, transmission speed, and fuel injection duration. The following is an analysis of the flow diagram without regard to the choice made by the operation.

Block 18 indicates that the microcomputer carries out the calculations relative to fuel consumption and work output per unit time for the utility vehicle from data including the engine speed, transmission speed, as well as parameters such as the width of the rear wheels, the coefficient of friction of the rear wheels, slippage of the rear wheels, weight of the tractor and trailer, and additional parameters so that the calculated fuel use and output per unit time is reasonably close to the actual values. Some of the additional parameters include the depths of penetration of the wheels into the soil and the soil conditions. Such calculations can be based on empirical relationships and are known in the art.

Block 19 indicates that the calculation is carried out to determine the engaged gear or gear ratio based on real time measurements. The decision block 20 considers real time, engine speed and t he optimum range as determined by the input in block 16. If the engine speed is in the predetermined optimum range, the next block is block 21 which determines if the engine torque or engine power output or transmission loading is in the predetermined optimum range as determined by block 16. If the load is in the optimum range, the next block is block 27 which provides a display to inform the operator or driver that the utility vehicle is operating within the selected ranges.

If the transmission load in block 21 is not in the optimum range, then block 22 is used to determine if the load is too high. If too high, then block 31 is used to calculate which gear should be used and to present a display to the operator or driver for the selection of this gear in order to bring the operation of the utility vehicle to the predetermined optimum ranges. Block 31 also indicates that an automatic shift down can be initiated if an automatic system is included in the device.

If the transmission load is not too high in block 22, then block 29 will have the display for the operator indicate a proposed gear for the predetermined operation of the utility vehicle. Block 29 also indicates that an automatic operation can be initiated for a shift up.

If block 20 indicates that the engine speed is outside the optimum range, then block 23 determines if the engine speed is too high. If the engine speed is too high, then block 24 determines if the transmission load is in the optimum range. If the load is in the optimum range, then block 28 signals the operator to decelerate or initiates an automatic deceleration. If the load is not in the optimum range, then block 29 provides a signal for the proposed gear or initiates an automatic shift up.

If the engine speed is not too high in block 23, then block 25 determines if the load is in the optimum range. If the load is in the optimum range then block 30 signals the operator to accelerate or initiates an automatic acceleration. If the load is not in the optimum range in block 25, then block 26 determines if the load is too high. Block 26 is connected to blocks 30 and 31 which supply appropriate corrections.

The information from blocks 27, 28, 29, 30 and 31 is also coupled to block 32 which calculates digital values corresponding to the information generated in these respective blocks. The digital values in block 32 are stored in a memory as indicated in block 33 and can be displayed as shown in block 34. Block 35 indicates a return to the block 14 to start the flow diagram.

FIG. 3 shows a block diagram of the invention. A utility vehicle engine 1 is coupled to a vehicle transmission system 2. Sensors 3 detect the engine speed and the engine torque or power output while the sensors 4 detect the rotational speed of the transmission and the engaged operating gear of the transmission. A conventional microcomputer 5 is used to store data and carry out computations to produce output signals to either inform the operator and/or initiate automatic compensating changes in the engine speed and/or the engaged transmission gear.

The microcomputer 5 includes a ROM 7a and a RAM 7b. The ROM 7a typically includes information relating to gear ratios, rotational speed of the engine, rotational speed of the transmission system, correlation between operating properties of the engine and the transmission system, data relating to engine efficiency, data relating to duration of fuel injection to the operation of the engine and fuel consumption, etc. Typically, the RAM 7b is preprogrammed to carry out operations and includes information relating to the working width of the tractor, the working width of the trailer, nominal values of fuel costs, data relating to the fuel consumption per unit area covered by the tractor trailer, data relating to the efficiency of operation over an area per unit time, etc. Generally, the data and information for the ROM 7a and the RAM 7b can be collected from measurements and calculations without undue difficulty or experimentation. The extent of the data and information depends, in part, on the sophistication of the calculations being carried out. Other data and information which might be desired is evident from the instant disclosure.

The software for carrying out the computations in the microcomputer 5 can be prepared by a person who is knowledgeable in the preparation of software and utilizes known computational techniques, formulas and concepts associated with the operation of utility vehicles. For example, farming is one of the oldest occupations known to man and numerous publications are available showing analytical techniques.

A switch 8 is provided for the operator to select one of two operating ranges. The operator can choose either an operation for favoring fuel economy or for saving time in carrying out the task (maximizing output per unit time). The selection made by the operator using the switch 8 determines the software operation to be carried out by the microcomputer 5. Based on this selection, the microcomputer will produce output signals utilizing the information transmitted by the sensors 3 and 4 in conjunction with the data in the ROM 7a and in the RAM 7b.

A displaying means 6 informs the operator the status of the engine and the transmission system relative to the preselected operating conditions. For example, if the microcomputer 5 determines that the engine speed is outside the optimum range, light 9 informs the operator to either increase the engine speed by showing an arrow pointing up or to decrease the engine speed by showing an arrow pointing down. If the microcomputer 5 determines that the transmission system is not in the optimum range for engine power output or transmission output, light 10 is used to inform the operator to change the transmission gear. If a lower gear is needed, then the light 10 on the left showing a steep incline informs the operator. Otherwise, light 10 on the right, showing a lesser incline lights to indicate a lower gear is required.

In another embodiment, the microcomputer 5 can be connected to a display 12 which identifies the gear to be used by the operator in order to bring the operation of the utility vehicle to the selected optimum ranges.

In yet another embodiment, an automatic system 13 can be coupled to the microcomputer 5 and responsive to the microcomputer 5 to automatically change the engine speed and/or the transmission system to maintain operation of the utility vehicle within the selected operating ranges. The implementation of the automatic system 13 can be carried out using conventional technology. The display 6 as well as the display 12 can be used in addition to the automatic system 13 to inform the operator the real time status of the operation of the utility vehicle.

Although the invention has been shown and described with reference to certain preferred embodiments, it is understood that the invention is not limited to the disclosure of these embodiments and that modifications and alterations can be made within the scope of the appended claims.

What is claimed is:

1. A device for optimizing the driving parameters of a farming tractor for use with an agricultural implement, said tractor including an engine having an engine rotational speed controllable by an operator of said tractor and an engine power output, said tractor also including a transmission having a gear position controllable by said operator of said tractor and a rotational speed at its output, said device comprising
   a processor,
   switch means associated with said processor for enabling an operator of said tractor to select between first and second ranges of engine rotational speed and engine power output, said first and second ranges of engine rotational speed and engine power output corresponding to optimized fuel use and optimized work output per unit time, respectively,
   memory means associated with said processor for storing data corresponding to said first operating range and data corresponding to said second operating range, in response to said switch means said processor obtaining from said memory the data corresponding to the selected operating range,
   sensing means for sensing data concerning the actual rotational speed and load of said engine and the actual rotational speed and gear position of said transmission and for communicating said sensed data to said processor, said processor processing said sensed data and said data stored in said memory corresponding to said selected operating range to determine how said engine rotational speed and said gear position should be adjusted by said operator to bring said tractor into said selected operating range, and
   indicator means responsive to said processor for indicating to said operator how said engine rotational speed and said gear position should be adjusted by said operator to bring said tractor into said selected range to optimize performance with respect to fuel consumption or work output per unit time.

2. A device for optimizing the driving parameters of a farming tractor for use with an agricultural implement, said tractor including an engine having a controllable engine rotational speed and an engine power output and a transmission having a controllable gear position, said device comprising
   a processor, switch means associated with said processor for enabling an operator of said tractor to select between first and second operating ranges of engine rotational speed and engine power output, said first and second ranges of engine rotational speed and engine power output corresponding to optimized performance with respect to first and second objectives, memory means connected to said processor for storing data corresponding to said first and second ranges of engine rotational speed and engine power output, in response to said switch means said processor obtaining from said memory means said data corresponding to the selected operating range, sensing means for sensing data concerning at least the actual rotational speed and load of said engine and for communicating said sensed data to said processor, said processor processing said sensed data and said data stored in said memory corresponding to the selected operating range to determine how said engine rotational speed and said gear position should be adjusted to bring said tractor into said selected range, and means for adjusting said engine rotational speed and said gear position in accordance with an output of said processor for bringing said tractor into said selected operating range corresponding to optimal performance with respect to one of said objectives.

3. A method for optimizing the driving parameters of a farming tractor used with an agricultural implement, said method comprising the steps of, selecting between first and second operating ranges of engine rotational speed and engine power output of said tractor and communicating said selection to a processor via switch means, said first and second operating ranges of engine rotational speed and power output corresponding to optimized fuel usage and optimized work output per unit time, respectively, in response to said selection, accessing a memory connected to said processor which stores data corresponding to said first and second operating ranges to obtain the data corresponding to the selected one of said operating ranges, sensing the actual load and rotational speed of said engine and sensing the gear position and rotational output speed of a transmission of said tractor and transmitting the sensed data to said processor, processing at said processor the sensed data and the data accessed from said memory to determine adjustments in said engine rotational speed and said gear position to bring said tractor into said selected range, and indicating said adjustments to an operator of said tractor so that the operator can make said adjustments.

4. A method for optimizing the driving parameters of a farming tractor for use with an agricultural implement, said method comprising the steps of selecting between first and second operating ranges of engine rotational speed and engine power output of said tractor and communicating said selection to a processor via switch means, said first and second operating ranges of engine rotational speed and power output corresponding to optimized tractor performance with respect to first and second objectives, in response to said selection, accessing memory means connected to said processor which stores data corresponding to said first and second operating ranges to obtain the data corresponding to the selected one of the operating ranges, sensing at least the actual engine rotational speed and load of the tractor engine and transmitting the sensed data to the processor, processing at said processor the data obtained from said memory and the sensed data to determine adjustments in said engine rotational speed and in a gear position of a transmission of said tractor required to bring said tractor into said selected operating range, and adjusting said engine rotational speed and said gear position in accordance with an output of said processor to bring said tractor into said selected operating range so as to optimize the performance of the tractor with respect to one of said objectives.

* * * * *